(12) United States Patent
Macquin et al.

(10) Patent No.: US 9,482,768 B2
(45) Date of Patent: Nov. 1, 2016

(54) FAST FASTENING ANTIFOULING TAPE OR SUBSTRATE USEABLE IN MARINE SEISMIC SURVEYS

(71) Applicant: CGG SERVICES SA, Massy (FR)

(72) Inventors: Raphaël Macquin, Montrouge (FR); Hélène Tonchia, Antony (FR)

(73) Assignee: CGG SERVICES SA, Massy (FR)

( * ) Notice: Subject to any disclaimer, the term of this patent is extended or adjusted under 35 U.S.C. 154(b) by 281 days.

(21) Appl. No.: 14/155,421

(22) Filed: Jan. 15, 2014

(65) Prior Publication Data

US 2014/0204706 A1    Jul. 24, 2014

Related U.S. Application Data

(60) Provisional application No. 61/755,683, filed on Jan. 23, 2013.

(51) Int. Cl.
*G01V 1/38* (2006.01)
*G01V 1/20* (2006.01)

(52) U.S. Cl.
CPC .............. *G01V 1/201* (2013.01); *Y10T 156/10* (2015.01)

(58) Field of Classification Search
CPC ............................. G01V 1/201; Y10T 156/10
USPC ........................................................ 367/15, 17
See application file for complete search history.

(56) References Cited

U.S. PATENT DOCUMENTS

| | | | | |
|---|---|---|---|---|
| 2,570,059 A * | 10/1951 | Hurxthal | ................ | B65D 59/00 206/586 |
| 4,620,396 A * | 11/1986 | Bjorntwedt | ............ | B65D 75/14 383/4 |
| 4,816,111 A * | 3/1989 | Pittarello | ........... | B65H 19/1852 156/504 |
| 5,226,380 A | 7/1993 | Fischer | | |
| 7,835,222 B2 | 11/2010 | Lobe et al. | | |
| 7,842,288 B2 * | 11/2010 | Weed | ....................... | B05D 7/54 106/1.23 |
| 2004/0241433 A1* | 12/2004 | Howard | .............. | B29C 63/0013 428/343 |
| 2010/0020644 A1 | 1/2010 | Vignaux | | |
| 2010/0278011 A1 | 11/2010 | Harrick | | |
| 2011/0174207 A1 | 7/2011 | Harrick et al. | | |
| 2011/0255369 A1 | 10/2011 | Harrick et al. | | |
| 2014/0356587 A1* | 12/2014 | Hara | ..................... | B63B 59/045 428/189 |

FOREIGN PATENT DOCUMENTS

WO    2012/006687 A1    1/2012

OTHER PUBLICATIONS

"Go-Faster Strips, Stripes, Rihlets, etc.: Speedskating Drag Reduction and the 'Lost Dutchman Olympic Gold Mine'," P. J. Baum, 1998, downloaded Nov. 9, 2011 from http:/ /sbspeed ,s5 .com/ RibletFlow .html, 7 pp.*

* cited by examiner

*Primary Examiner* — Daniel L Murphy

(74) *Attorney, Agent, or Firm* — Patent Portfolio Builders PLLC

(57) ABSTRACT

A streamer usable underwater for a marine seismic survey has a portion adjacent to a protuberance covered by an adhesive antifouling tape or substrate. The tape, which may be made of copper or copper alloy is configured to be fast fastened, may be applied when the streamer is deployed and may be covered by a protective jacket during recovery.

20 Claims, 6 Drawing Sheets

FAST FASTENING ANTIFOULING TAPE OR SUBSTRATE USEABLE IN MARINE SEISMIC SURVEYS

CROSS REFERENCE TO RELATED APPLICATIONS

This application claims priority and benefit from U.S. Provisional Patent Application No. 61/755,683, filed on Jan. 23, 2013, for "Fast Fastening Antifouling Tape or Substrate," the entire content of which is incorporated in its entirety herein by reference.

BACKGROUND

1. Technical Field

Embodiments of the subject matter disclosed herein generally relate to devices and methods for limiting and/or preventing deposits on a streamer used underwater during marine seismic surveys, and, more particularly, to mounting a fast fastening antifouling tape or substrate on streamers before and/or after protuberances.

2. Discussion of the Background

In the oil and gas industry, geophysical surveys are used to evaluate underground formations both on land and offshore. An image of the explored underground formation is generated based on seismic reflections from a formation's layer interfaces, detected by seismic receivers towed concurrently with a seismic source.

Seismic exploration campaigns may last long periods (e.g., several months). Preferably, during these campaigns, the streamers remain in the water (except, for example, in cases of extreme unfavorable weather conditions) because recovering/deploying them is expensive and tedious. While the streamers are immersed in seawater for several consecutive months, at a shallow depth (a few meters), and dragged at a low speed (less than or equal to 5 knots), the streamers' outer surfaces are subject to fouling, particularly due to the proliferation of microorganisms (i.e., bio-fouling). One of the most common types of microorganisms attaching to streamers is the barnacle, which adheres permanently to a hard substrate, either by growing its shells directly onto the substrate or by means of a stalk. The biofouling first occurs in turbulence areas where there is a protuberance on the streamer (e.g., a bird collar or weigh mounted thereon). For example, FIG. 1 illustrates barnacle 10 growing in abundance in locations at which diameter varies in longitudinal direction, a portion 20 having a larger diameter than the adjacent portions 30 and 40 of the streamer.

In time, bio-fouling results in substantial disadvantages such as:
(1) generating hydrodynamic flow noise;
(2) amalgams or incrustations forming on the streamer's outer surfaces, which are likely to disturb seismic measurements;
(3) increasing drag on the streamers and, consequently, increasing fuel consumption to tow them;
(4) a strong, unpleasant stench developing within a few days when streamers covered with biofouling are recovered and exposed to air; and
(5) the streamer's outer shell being pierced by certain types of biofouling, resulting in water intake inside the streamer.

Several techniques have been applied conventionally to address the biofouling problem. For example, a cleaning device with rotary brushes and/or blades may be temporarily or permanently attached on streamers to clean their outer surfaces. The use of cleaning devices is impeded by the presence of protuberances on the streamers, often resulting in a more effective cleaning exactly where most needed, near protuberances. Although cleaning devices continue to be subject to research and improvement, their practical value (reliability versus cost) remains unsatisfactory.

Another conventional technique used to address the biofouling problem involves using antifouling paints (also used on boat hulls). However, "antifouling" paints generally contain tributyltin (TBT), which is toxic. Such antifouling paints are therefore used with caution, from an environmental standpoint, to minimize seawater pollution. The safe use of antifouling paints is also problematic for the persons likely to be in contact with TBT during the manipulation of seismic streamers. Furthermore, techniques for applying "antifouling" paint are hardly compatible with technical and economical constraints linked to seismic streamers; painting them is a long and costly operation due to the streamer's length. In addition, to allow the paint to dry (to minimize seawater pollution), the painted seismic streamers have to be stored in a manner that requires a considerable amount of space, which is not economically viable onboard a vessel.

Accordingly, it would be desirable to provide devices, systems, and methods addressing the biofouling problem of streamers used in marine seismic explorations in an economically attractive manner while avoiding the afore-described problems and drawbacks.

SUMMARY

The fast fastening antifouling tape or substrate, which can be mounted in areas adjacent to protuberances (e.g., while the streamers are deployed), decreases biofouling in these areas, thereby reducing fuel consumption, noise, and increasing productivity (e.g., by increasing streamers' operative periods).

According to one embodiment, there is a streamer usable underwater for marine seismic surveys. The streamer includes a tubular shell hosting equipment used in acquiring seismic data. The streamer further includes at least one mounted device that extends at least partially outside the tubular shell, creating a protuberance thereon. The streamer also includes an adhesive antifouling tape wrapped around at least one portion of the tubular shell, adjacent to the protuberance in a longitudinal direction.

According to another embodiment, there is a streamer usable underwater for marine seismic surveys, which has at least one device mounted on a tubular member and is configured to cause a protuberance thereon. The streamer further includes a fast fastening layer covering a portion of the tubular member adjacent to the protuberance in a longitudinal direction and configured to reduce bio-fouling.

According to another embodiment, there is a seismic survey system including at least one streamer having (A) a tubular shell hosting equipment used in acquiring seismic data, (B) at least one device mounted on the tubular shell, and (C) an adhesive antifouling tape. The device is mounted on the streamer to have a projection outside the tubular shell. The adhesive antifouling tape is wrapped around at least one portion of the tubular shell adjacent to the device, in a longitudinal direction.

According to another embodiment, there is a method for preventing biofouling deposits in areas adjacent to a device mounted on a streamer. The method includes applying an adhesive antifouling layer around at least one portion of the streamer, adjacent to the device in a longitudinal direction, to smooth transitions from the cable to the device and to reduce turbulence when the streamer with the device is towed underwater. The method further includes deploying a streamer with the device and the adhesive antifouling layer in water, recording seismic survey data using seismic receivers inside the streamer, and recovering the streamer from the water. The method also includes covering the antifouling layer with a protective jacket to prevent damage while the streamer is outside the water.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine survey system including towed streamers. However, the embodiments to be discussed next are not limited to these structures, but may be applied to other structures that are towed for a long time underwater during a marine survey, such as wave sources and other structures and devices there-between.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 1:
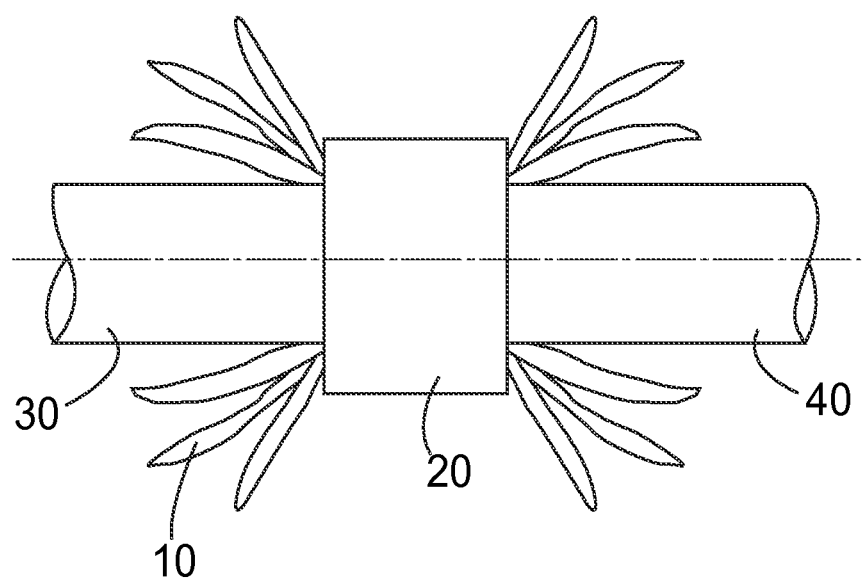
FIG. 1 illustrates locations favorable to abundant barnacle growth on a streamer.
Figure 2:
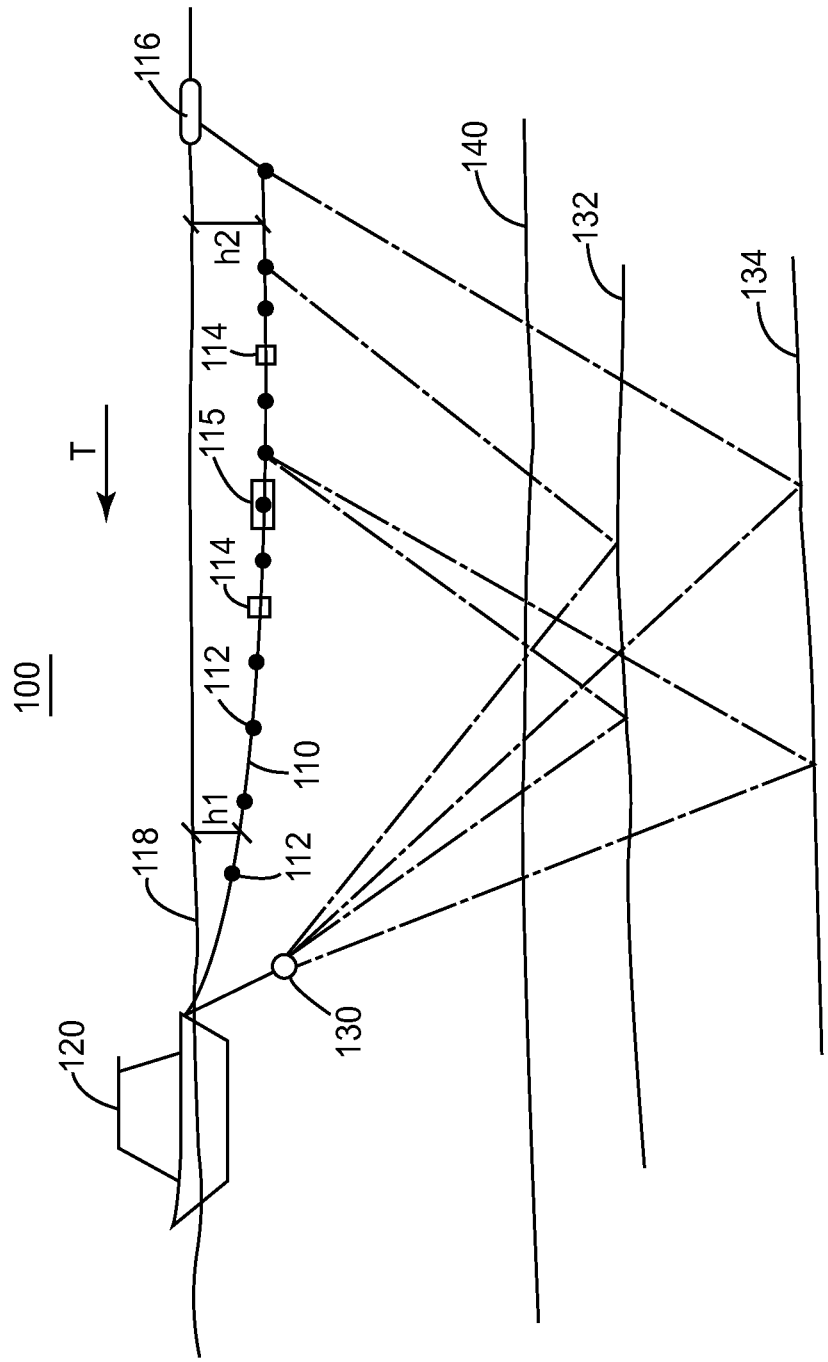
FIG. 2 is a schematic diagram of a marine seismic survey system according to an embodiment.

A marine seismic survey system 100 according to one embodiment is illustrated in FIG. 2. The term "seismic," which implies the seismic manner of exploring the underground structure, is merely exemplary and not intended to be limiting, therefore the disclosed embodiments are useable when the manner of exploring the underground structure is different (e.g., electro-magnetic). System 100 includes one or more streamers 110 (only one illustrated) towed by a vessel 120. Vessel 120 may also tow a seismic source 130 that generates seismic waves directed toward the ocean floor 140. The waves are reflected by underground structure interfaces 132 and 134, which separate layers that have different seismic wave propagation speeds. The reflected waves are detected by seismic receivers 112 (only a few are labeled) distributed along streamer 110.

In addition to the seismic receivers, the streamer may carry trajectory correction devices 114 (also known as birds) to maintain the streamer's predetermined depth profile and lateral position (e.g. relative to the vessel and/or other streamers). The streamer may be configured and operated so that the distance from the streamer to the water surface 118 may vary along the streamer length (e.g., $h_1 < h_2$ in FIG. 2). For example, a weight 115 may be attached to achieve the intended depth-varying profile. The streamer 110 may also have a tail buoy 116 attached to its distal end.

Figure 3:
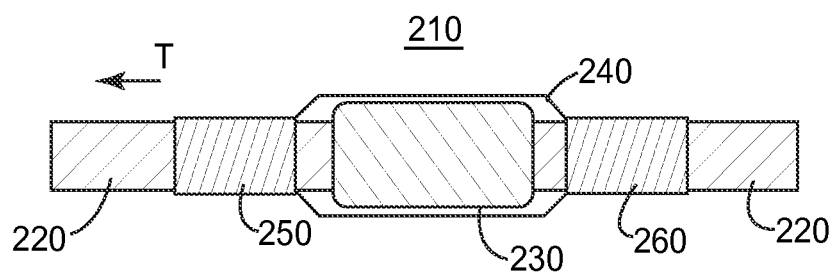
FIG. 3 illustrates a portion of a streamer according to an embodiment.

FIG. 3 illustrates a portion 210 of a streamer (e.g., 110 in FIG. 2) which is usable underwater for marine seismic surveys. The streamer includes a tubular shell 220 which is a strength member configured to shield from water and protect the equipment (such as wave detectors, not shown in this figure) used in acquiring seismic data. Since the streamer's length (e.g., few kilometers) is substantially larger than its width (less than 1 m), the tubular shell is a longitudinal member. Weight 230, which is mounted on this portion 210 of the streamer, extends at least partially outside tubular shell 220, thereby creating a protuberance (e.g., a portion with larger diameter than the tubular shell's diameter). Weight 230 may be covered by fairing 240. An adhesive antifouling tape is wrapped around portions 250 and 260 of the tubular shell, adjacent to the protuberance in a longitudinal direction T (the towing direction when the streamer is towed). In other embodiments, the adhesive antifouling tape may be wrapped only before or only after the protuberance. The tape may be mounted to cover, at least partially, fairing 240.

Figure 4:
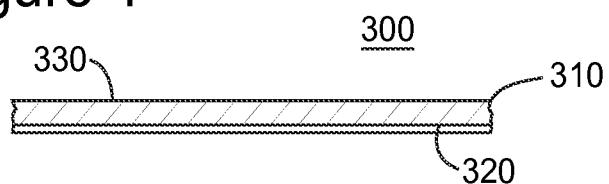
FIG. 4 is a cross-section of an adhesive tape according to an embodiment.

A cross-section of an adhesive tape according to an embodiment is illustrated in FIG. 4. Adhesive tape 300 has a main layer 310 which may include copper or a copper alloy, which are ductile and have the property of preventing biofouling deposits. Main layer 310 may also include another antifouling substance (such as cayenne powder). On an inside surface of the tape (that is not exposed to water when the tape is mounted on the streamer) there may be an adhesive layer 320 applied. The presence of this adhesive layer makes the tape stay firmly attached to the surface on which it is applied. An outer surface 330 of the tape (that is exposed to water when the tape is mounted on the streamer) may be configured to have an antifouling property. For example, the surface may have very low roughness.

Figure 5:
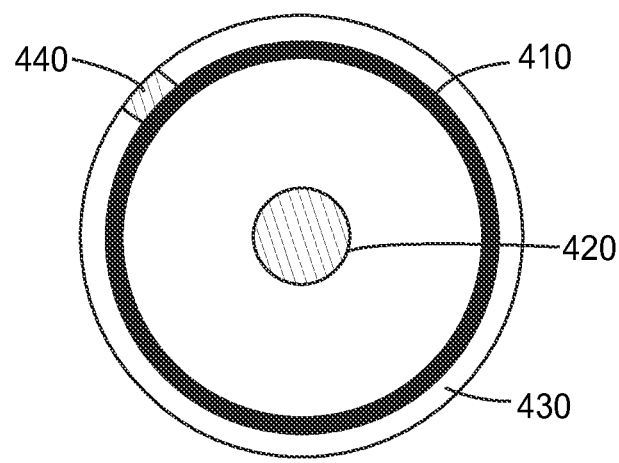
FIG. 5 illustrates a cross-section of the streamer in a tape-covered area according to an embodiment.

In one embodiment the adhesive tape may be configured to include a closure system configured to join sides of the adhesive antifouling tape. FIG. 5 illustrates a cross-section of the streamer in the tape-covered area 250 in FIG. 3, perpendicular to the longitudinal direction. Tubular shell 410 which houses inside equipment 420 is covered by tape 430. Between the equipment and the tubular shell there may be a light material whose presence causes the streamer to have neutral bouyancy. The circular or round cross-section is merely exemplary and should not be considered a limitation.

Figure 6A:
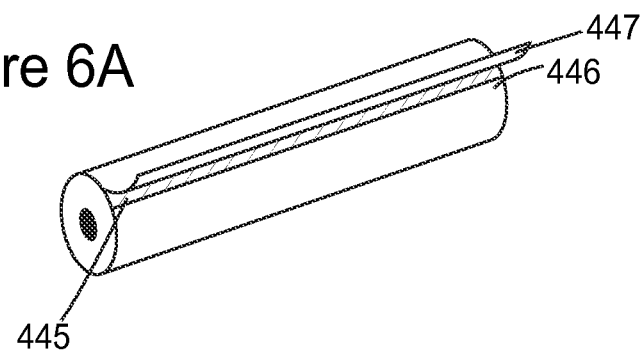
FIGS. 6A, 6B, and 6C illustrate closure systems according to various embodiments.
Figure 6B:
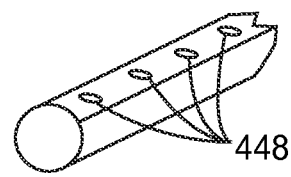
Figure 6C:
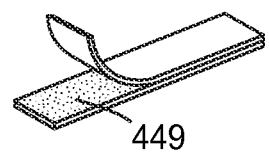

Tape 430 is fastened by a closure system 440 configured to connect overlapping surfaces of the tape. For example, as illustrated in FIG. 6A, the closure system may include a longitudinal adhesive layer 445 applied to an outer surface 446 of the tape, this longitudinal adhesive layer being covered by overlapping surface 447 of the tape. In other embodiments, the closure system may include pressure buttons 448 as illustrated in FIG. 6B, and/or Velcro-type connectors 449 as illustrated in FIG. 6C.

Figure 7A:
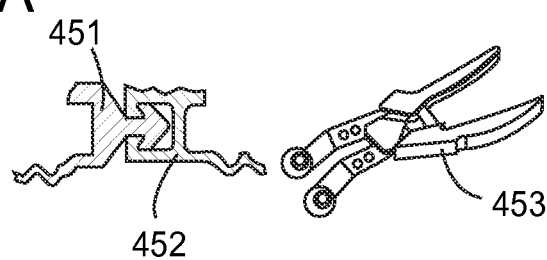
FIGS. 7A, 7B, 7C and 7D illustrate closure systems including pre-formed shapes, and tools used to interlock and/or unlock the pre-formed shapes according to various embodiments.
Figure 7B:
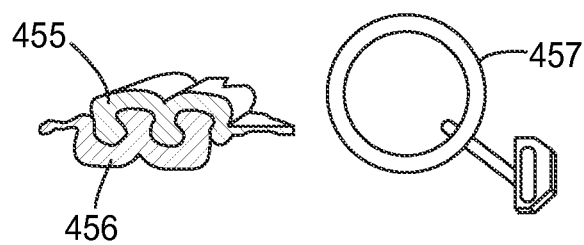
Figure 7C:
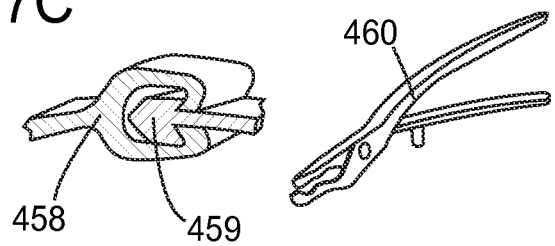
Figure 7D:
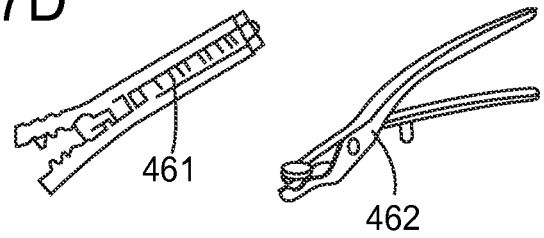

The closure system may also include pre-formed shapes located along the tape's sides and configured to interlock when the tape is mounted along the streamer. For example, FIG. 7A illustrates a male part 451 and a female part 452 engaged with each other and separated using a tool 453. In another example, FIG. 7B illustrates a first type of molded shapes 455 and 456 engaged with each other and then separated using tool 457. Yet in another example, FIG. 7C illustrates a second type of molded shapes 458 and 459 engaged with each other and separated using a tool 460. In yet another embodiment, FIG. 7D illustrates a zipper type of closing system 461 and a tool 462 that may be used to open/close this type of system.

Figure 8:
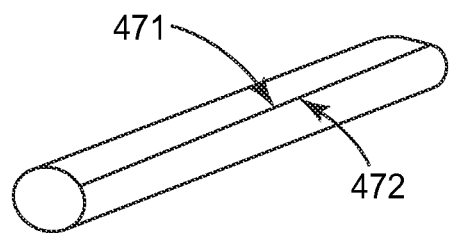
FIG. 8 illustrates another closure system according to an embodiment.

In another embodiment illustrated in FIG. 8, sides 471 and 472 of the tape are welded by ultrasound or by temperature when the tape is mounted along the streamer.

In some embodiments, the tape is configured to be removed without damaging the tubular shell and/or the device causing the protuberance. In some embodiments the tape may be replaced by other media/substrate. In some areas along the streamer, before or after protuberances, a local treatment may be applied instead of tape.

Figure 9:
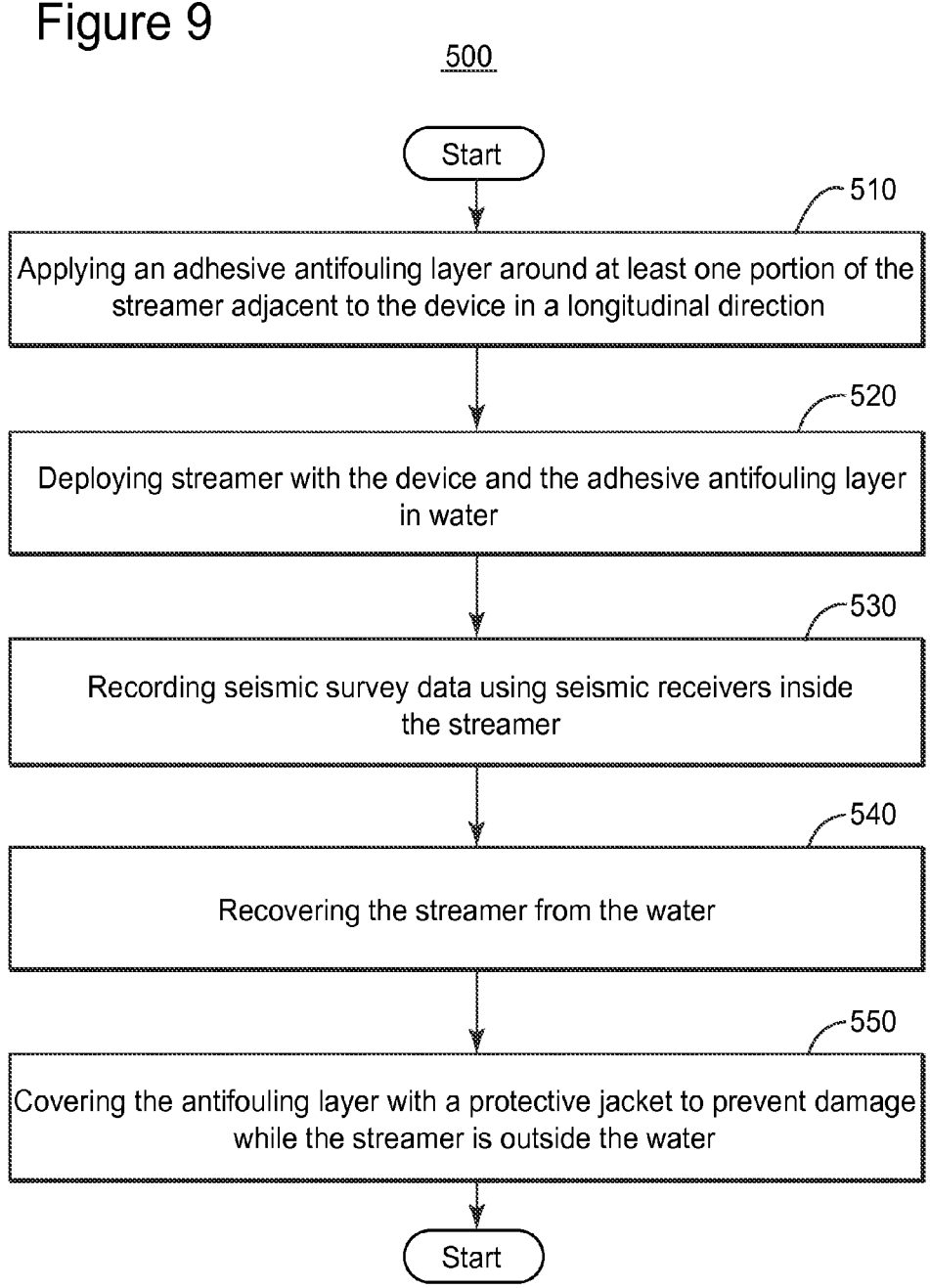
FIG. 9 is a flowchart illustrating steps performed by a method for preventing biofouling deposits in areas adjacent to a device mounted on a streamer according to an embodiment.

The areas covered with tape may be covered with a protective jacket to avoid corrosion/abrasion and preserve its antifouling properties. FIG. 9 is a flowchart illustrating steps performed by a method 500 for preventing biofouling deposits in areas adjacent to a device mounted on a streamer. Method 500 includes applying an adhesive antifouling layer around at least one portion of the streamer adjacent to the device in a longitudinal direction, to smooth the transition from the streamer to the device, reducing turbulence when the streamer with the device is towed underwater, at 510.

Method 500 further includes deploying the streamer with the device and the adhesive antifouling layer in water, at 520, recording seismic survey data using seismic receivers inside the streamer, at 530, and recovering the streamer from the water, at 540.

Method 500 then includes covering the antifouling layer with a protective jacket to prevent damage while the streamer is outside the water, at 550. The adhesive antifouling layer may include copper or a copper alloy. The adhesive antifouling layer may be configured as a tape that is wrapped around the portion before deploying the streamer.

The disclosed exemplary embodiments provide streamers, survey systems, and related methods for preventing biofouling deposits in areas adjacent to a device mounted on a streamer. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element can be used alone without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A streamer usable underwater for marine seismic surveys, the streamer comprising:
   a tubular shell hosting equipment used in acquiring seismic data;
   at least one device mounted on the streamer such that to extend at least partially outside the tubular shell, to create a protuberance thereon; and
   an adhesive antifouling tape wrapped around at least one portion of the tubular shell, adjacent to the protuberance in a longitudinal direction, to smooth a transition from the tubular shell to the protuberance, which reduces a turbulence at the protuberance.

2. The streamer of claim 1, wherein the antifouling tape comprises copper or copper alloys.

3. The streamer of claim 1, wherein the antifouling tape comprises a biocide substance.

4. The streamer of claim 1, wherein the adhesive antifouling tape includes an adhesive layer on an inner side which is mounted in contact with an outer surface of the tubular shell.

5. The streamer of claim 1, wherein the adhesive antifouling tape has an outer surface configured to have an anti-fouling property.

6. The streamer of claim 1, wherein the tape includes a closure system configured to join sides of the adhesive antifouling tape.

7. The streamer of claim 6, wherein the closure system includes at least one of pressure buttons and VELCRO connectors.

8. The streamer of claim 6, wherein the closure system includes pre-formed shapes located along the sides and configured to interlock.

9. The streamer of claim 1, wherein sides of the adhesive antifouling tape are welded with ultrasound or by temperature.

10. The streamer of claim 1, wherein the tape is mounted to cover, at least partially, a fairing of the at least one device.

11. The streamer of claim 1, wherein the at least one device includes at least one of a connector, a collar, a bird and a weight.

12. The streamer of claim 1, wherein the at least one portion includes a first portion before the one of the protuberances and a second portion after the one of the protuberances in the longitudinal direction.

13. The streamer of claim 1, wherein the antifouling tape is removable without damaging the tubular shell and/or the at least one device.

14. A streamer usable underwater for marine seismic surveys, the streamer comprising:
   at least one device mounted on a longitudinal member and configured to cause a protuberance thereon; and a fast fastening layer covering a portion of the longitudinal member adjacent to the protuberance in a longitudinal direction and configured to reduce bio-fouling by smoothing a transition from the longitudinal member to the protuberance, which reduces a turbulence at the protuberance.

15. The streamer of claim 14, wherein the fast fastening layer has an antifouling property.

16. The streamer of claim 14, wherein the fast fastening layer includes copper or copper alloy.

17. A seismic survey system comprising at least one streamer having a tubular shell hosting equipment used in acquiring seismic data;

at least one device mounted on the tubular shell such that to have a projection outside the tubular shell; and an adhesive antifouling tape wrapped around at least one portion of the tubular shell adjacent to the device, in a longitudinal direction, to smooth a transition from the tubular shell to the device, which reduces a turbulence at the device.

18. A method for preventing bio-fouling deposits in areas adjacent to a device mounted on a streamer, the method comprising:

applying an adhesive antifouling layer around at least one portion of the streamer adjacent to the device in a longitudinal direction, to smooth a transition from the streamer to the device, which reduces to a turbulence when the streamer with the device is towed underwater;

deploying the streamer with the device and the adhesive antifouling layer in water;

recording seismic survey data using seismic receivers located inside the streamer;

recovering the streamer from the water; and covering the antifouling layer with a protective jacket to prevent damage while the streamer is outside the water, wherein the device creates a protuberance relative to the streamer.

19. The method of claim 18, wherein the adhesive antifouling layer includes copper or a copper alloy.

20. The method according to claim 18, wherein the adhesive antifouling layer is configured as a tape that is wrapped around the portion before deploying the streamer.

* * * * *